United States Patent

Gardziella et al.

[11] Patent Number: 5,254,639
[45] Date of Patent: Oct. 19, 1993

[54] BINDING AGENTS

[75] Inventors: Arno Gardziella, Witten-Rüdinghausen; Achim Hansen, Iserlohn-Letmathe; Stephan Schröter, Essen; Josef Suren, Wünnenberg Haaren, all of Fed. Rep. of Germany

[73] Assignee: Rutgerswerke Aktiengesellschaft AG, Fed. Rep. of Germany

[21] Appl. No.: 966,287

[22] Filed: Oct. 26, 1992

[30] Foreign Application Priority Data

Nov. 7, 1991 [DE] Fed. Rep. of Germany ....... 4136562

[51] Int. Cl.⁵ .............................. C08L 61/02
[52] U.S. Cl. ...................... 525/398; 528/1; 528/129; 528/149; 528/155; 528/163; 528/218; 528/230; 528/250; 528/254; 528/423; 525/405; 525/480; 525/481; 525/491; 525/496; 525/497; 428/224; 428/288; 428/290; 428/291; 106/38.2; 106/38.6; 106/218; 106/602; 106/603; 527/403; 188/251 A
[58] Field of Search ............... 528/129, 149, 155, 163, 528/218, 230, 250, 254, 423, 1; 525/398, 405, 408, 481, 491, 496, 497; 428/224, 288, 290, 291; 106/38.2, 38.6, 218, 602, 603; 527/403; 188/251 A

[56] References Cited

U.S. PATENT DOCUMENTS

| 2,956,033 | 10/1960 | Apel et al. | 527/403 |
| 3,017,303 | 1/1962 | Ayers | 428/529 |
| 4,058,403 | 11/1977 | Funabiki et al. | 106/56 |
| 4,072,531 | 2/1978 | Funabiki et al. | 106/56 |
| 4,105,606 | 8/1978 | Forss et al. | 524/73 |
| 4,320,036 | 3/1982 | Gobran et al. | 524/14 |
| 4,469,858 | 9/1984 | Chen | 528/129 |
| 4,877,761 | 10/1989 | Chmiel et al. | 501/109 |
| 4,918,116 | 4/1990 | Gardziella et al. | 523/149 |
| 5,010,156 | 4/1991 | Cook et al. | 527/403 |

FOREIGN PATENT DOCUMENTS

| 0248980 | 12/1987 | European Pat. Off. |
| 0249959 | 12/1987 | European Pat. Off. |
| 2723792 | 11/1978 | Fed. Rep. of Germany |
| 4015440 | 11/1991 | Fed. Rep. of Germany |

Primary Examiner—John Kight, III
Assistant Examiner—Sam A. Acquah
Attorney, Agent, or Firm—Bierman and Muserlian

[57] ABSTRACT

A binding agent for molded bodies and molding compositions produced by prereacting a mixture of 5 to 60% by weight of lignin or a lignin fraction produced by the Organosolv process and 40 to 95% by weight of a phenol novolac resin and subjecting the latter to high shear forces in a kneader or extruder and optionally mixing the same with a curing agent useful in molding compositions and high temperature-stable molded products such as refractory products, friction coatings, textile fleeces and carbon or graphite materials.

15 Claims, No Drawings

BINDING AGENTS

STATE OF THE ART

In the field of carbon-forming binding agents for carbon materials and refractory products, primarily tar or pitch comprised of polycyclic hydrocarbons were used previously. Today, synthetic resins, specifically furan and phenol resins, have gained importance as binding agents. In the resin state, they are free of toxic polycyclic hydrocarbons such as benzo-a-pyrene and develop them during pyrolysis only to a very minor degree. Moreover, they avoid at increased temperatures smoke and soot formation and improve the quality and the processibility of the refractory compositions. Synthetic resins, however, are relatively expensive compared to binding agents generated from tar.

EP 248,980 describes binding agents for high temperature-stable molding substances comprising a phenol resin of this type with a molar ratio of phenol to formaldehyde of 1:0.2 to 1:0.55. To lower the cost of the binding agent, attempts have been made to dilute the expensive phenol resin with cost-effective cross-linkable substances such as residues from dimethyl terephthalate production (DE-P 2,723,792; DE-OS 3,620,473 and EP 249,959 A1) or from bisphenol A synthesis (DE-A 4,015,440). These synthesis residues however, are available only in limited quantities. Residues from dimethyl terephthalate production, moreover, have a high viscosity and are mixable only with difficulty. Through the addition of solvents or oils, the processibility can be improved, but these volatile components are largely set free again during heating and can cause undesirable smoke and soot formations.

Binding agents are also known in which a portion of the phenol resin has been replaced by lignin sulfonic acid. Sulfurized lignin obtained from chemical pulp digestion or the Kraft process is less active per se, but it can, for this purpose, be reactivated by the conversion with phenol in the presence of an acid and converted through reaction with formaldehyde to form a suitable resin which can be mixed with phenol resin.

Sulfurized lignin which has been converted with formaldehyde in the presence of a base and which has then been condensed with phenol is also suitable as diluting agent for phenol resins (Sundstrom, et al, Biotech. Bioeng. Symp. Vol. 12, p. 45 to 56 (1982)). It has however been found that the described sulfurized lignin derivatives cannot be mixed in any given quantity with the phenol resins since they have a negative effect on the processing properties and with increasing lignin content, the adhesive force of the resin mixture decreases strongly. A phenol resin containing 10% by weight of lignin sulfonic acid derivative no longer exhibits satisfactory properties and is above all relatively sensitive to moisture. Resins which can be produced in the same way using Kraft lignin or alkali metal lignin fractions behave similar to these lignin sulfonic acid resin mixtures.

It has also been attempted to replace phenol resins partially with Organosolv lignin. This chemically uniform accumulating sulfur-free lignin is soluble in ketones such as acetone and alcohols such as methanol and can be mixed in this form with a phenol novolac. A 1:1 mixture of lignin to phenol novolac at a solid resin content of approximately 2% (relative to the weight of the test bar of silica sand) results in a strong decrease of the cold flexural strength and the hot flexural strength compared to a mixture comprising only phenol resins as the binding agent. Both strengths decrease even greater with increasing lignin component.

Attempts to improve the properties of Organosolv lignin with prior reactions with phenol and formaldehyde lead to no signficant success. It is indeed possible to obtain in this way resin mixtures which are suitable for the production of pressboards and composite boards as well as for laminating wood veneer but high-quality products such as high temperature-stable molding substances, refractory products and particularly friction coatings can not be produced from them since the physical property profile of the products obtained in general is not sufficient.

OBJECTS OF THE INVENTION

It is an object of the invention to provide a binding agent comprising Organosolv lignin in greater amounts as an inexpensive an high quality additive meeting the requirements and quality of conventional lignin containing binding agents and a process for its preparation.

These and other objects and advantages of the invention will become obvious from the following detailed description.

THE INVENTION

The novel binding agents of the invention for molded bodies and molding compositions are produced by pre-reacting a mixture of 5 to 60% by weight of lignin or a lignin fraction produced by the Organosolv process and 40 to 95% by weight of a phenol novolac resin and subjecting the latter to high shear forces in a kneader or extruder and optionally mixing the same with a curing agent.

Preferred are Organosolv lignin fractions from coniferous or deciduous trees with mean molecular weights between 600 to 4,000, preferably 800 to 1,500. As synthetic resins, phenol novolacs can be used. For curing the resin mixture, hexamethylenetetramine or reactive resins such as phenol resols, epoxy resins or nitrogen-containing polymers can be added.

The resin mixtures of the invention can be used for the production of curable molding compositions, textile fleeces, refractory compositions as well as for friction coatings after they have been mixed intensively at increased temperature under the influence of high shear forces in a heatable mixer such as in a twin screw extruder, trough or tub kneading unit.

The lignin obtained in the Organosolv process under comparatively mild conditions has a relatively low mean molecular weight since its chemical structure has been changed only slightly through the effect of the process conditions.

Depending on how the process is carried out, this lignin is obtained either in admixture with hemicelluloses and other degradation products from the wood digestion or as pure lignin which after drying, can be obtained as a powder. In the lignin of this quality, compounds are present with molecular weights less than 5,000.

It has been found that low-molecular weight lignin with a mean molecular weight of 600 to 4,000, such as can be obtained through the Organosolv process, can be mixed in a special way under the influence of high shear forces with phenol novolac wherein a binding agent is obtained which without further chemical conversion can be used for the production of curable molding compositions, textile fleeces, friction coatings and refractory compositions.

Especially well suited are lignin fractions having a mean molecular weight of 800 to 1,500 and sintering point of 80° to 120° C. These fractions can be separated in a manner known per se from the lignin fractions of the Organosolv process or result in a two-stage process directly in a basic alcohol solution. These low-molecular weight lignins can be mixed in a solution form or as a dried powder with a phenol novolac at increased temperatures under the effect of high shear forces and with the addition of a curing agent at lower temperatures and, if necessary, together with additional processing aids to form a binding agent, which after curing, exhibits a particular good bond between the lignin-phenol novolac binding agent mixture and the added fillers.

Preforms produced with this binding agent mixture surprisingly have, in contrast to the previously known Organosolv lignin-phenol novolac binding agent mixtures, good mechanical, thermal and electrical properties which equal preforms produced with conventional non-modified phenol resins. Particularly good properties are evident in the use of the binding agent of the invention for the production of refractory compositions since they are insensitive to moisture, have high storage lives and lead to high green stability and surprisingly high carbon yields.

For the production of the binding agent of the invention, 5 to 60% by weight of powder-form Organosolv lignin and 40 to 95% by weight of a phenol novolac are premixed. After mixing the raw materials, the mixture obtained is homogenized at a temperature of 100° to 200° C., preferably at 130° to 160° C., through the effect of high shear forces. This is preferably carried out in heatable devices known per se and customarily used for processes of this type such as in a twin screw extruder, trough or tub kneader or in a coknearder. The temperature therein is set so that a good mixing of the individual components with one another takes place, but the lignin material simultaneously partially reacts with the phenol resin without a breakdown of the material used nor premature curing of the resin mixture taking place.

In this working process, a homogeneous product is obtained which after being cooled to room temperature, can potentially be pulverized in the dry state and is extremely well suited as a binding agent or binding agent component for pressing compositions, curable molding compositions, refractory compositions, friction materials or textile fleeces.

As the novolac for this purpose, all condensation products produced in an acidic medium based on phenols, cresols, and bisphenols with formaldehyde in a molar ratio of phenol to formaldehyde of 1:0.9 to 1:0.2 and a melting point of 50° to 110° C. can be used. In order to work gently, mixtures of low- and higher-melting novolacs can be used.

For further processing, 4 to 15% by weight of a curing agent, preferably hexamethylenetetramine, can be added to this binding agent mixture. Other suitable curing agents are reactive resins such as epoxy resins, phenol resols, amino resins or their mixtures in amounts of 10 to 60% by weight. Moreover, 0.05 to 1.2% by weight of a slip and parting agent, 4 to 6% by weight of a filler substance, and 0 to 20% by weight of fiber materials such as glass fibers can be added. As slip and parting agents are preferably used Me stearate (Me=Al, Ca, Mg, Li, Zn) in amounts of 0.1 to 0.8% by weight and wax in amounts of 0.1 to 0.8% by weight, particularly amide wax, ester wax, montan wax or hard paraffin.

In the following examples, there are described several preferred embodiments to illustrate the invention. However, it should be understood that the invention is not intended to be limited to the specific embodiments.

EXAMPLE 1

Lignin from the wood of coniferous trees obtained in the Organosolv process having a mean molecular weight of 1,000 and a sinter point of approximately 105° C. was intensively mixed in a ratio of 1:1 with a phenol novolac having a melting point of DIN ISO 10082 of 80° to 85° C. The premixture was mixed with 0.3% of calcium stearate and was homogenized on a twin screw extruder with high shear forces at 110° to 150° C. and was granulated to 2 mm after cooling. The granulate was extremely finely ground on an impeller breaker, and after grinding thoroughly, was mixed with 7% of hexamethylenetramine to obtain an extremely fine, powder.

EXAMPLE 2

Lignin from the wood of deciduous trees obtained in the Organosolv process with a mean molecular weight of 900 and a sinter point of 110° C. was intensively mixed with a phenol novolac having a melting point of DIN ISO 10082 of 75° to 80° C. in a ratio of 1:2. The premixture was mixed with 0.3% by weight of calcium stearate and the mixture was homogenized on a twin screw extruder at high shear forces at 110° to 145° C. After cooling, the mixture was granulated to 2 mm and the granulate was extremely finely ground on an impeller breaker. After grinding thoroughly, the product was mixed with 6.5% by weight of hexamethylenetetramine in extremely fine, power-form.

EXAMPLE 3

3 kg of powdered resin of Example 1 were thoroughly mixed with 2 kg of phenol novolac with a melting point of 80° to 85° C. according to DIN ISO 10082, 450 g of hexamethylenetetramine, 15 g of montan wax, 50 g of amide wax, and 3.8 kg of soft wood dust and the mixture was placed on cylinders heated to 100° to 130° C. The substance was densified within a rolling time of approximately 3 minutes to form a cohesive roller sheet and homogenized. The resulting roller sheet was pulled off and after cooling, it was ground to form a granulate of <2 mm. The granulate was molded in a molding process to form molded bodies and was then cured. The physical values of the molded bodies were considereably above the scope of the phenol resin molding compositions of type 31 according to DIN 7708. Molded partzs produced with it were distinguished by a good surface.

EXAMPLE 4

70 parts by weight of textile fiber mixture were thoroughly mixed with 30 parts by weight of the powder resinof Example 1. For the production of fiber fleece, the material was subjected to an aerodynamic fleece formation and deposited on a punched screen sheet. The uncured textile fleece form obtained was preheated in a heating cabinet at approximately 120° C. and then was pressed in a press at 180° C. to form sheets of 250 mm×250 mm. The sheets were compared with respect to strength (load and permanent deformation) and odor with production sheet material in which unmodified powder resin based on phenol resin had been used. The comparison of strength showed no differences. In the odor test of Ford, the products of the invention received grades from 1.6 to 2.1 while products which were free of lignin received grades of 2.4 to 2.8 (the odor quality increased with decreasing grades).

EXAMPLE 5

70 parts by weight of textile fiber mixture were thoroughly mixed with 30 parts by weight of the powdered resin of Example 2. For the production of fiber fleece, the material was subjected to an aerodynamic fleece formation and placed on a punched screen sheet. The uncured textile fleece form was preheated in a heat cabinet at approximately 120° C. and then pressed in a press at 180° C. to form sheets of 250×250 mm. The sheets were compared with respect to strength (load and permanent deformation) and odor with production sheet material in which unmodified powdered resin based on phenol resin had been used. The comparison of strength showed no difference. In the odor test of Ford, the products of the invention received grades of 1.6 to 2.0.

EXAMPLE 6

1.0 kg of powdered resin of Example 2 were intensively mixed with a mixture of 3 kg of steel wool, 1.5 kg of brass shavings, 1 kg of coke, 0.5 kg of graphite, 0.5 kg of polyaramide fiber (2 mm), 0.5 kg of glass fibers (2 mm), 1.5 kg of barium sulfate, 0.3 kg of hexamethylenetetramine (extremely fine, powder-form) and 0.7 kg of magnesium oxide. The mixture was used in the conventional manner for the production of friction coatings. The friction value determined using test samples which had been pressed for 30 seconds per mm/layer thickness at 170° C. and cured for 10 hours at 200° C. was 0.38 to 0.41.

EXAMPLE 7

9,500 g of a mixture of magnesite of diverse grain size were homogeneously mixed with 125 g of powdered resin of Example 1 as well as 125 g of powdered resin of Example 2 and 300 g of a 70% aqueous phenol resol (phenol formaldehyde ratio 1:1.5). After pressing into molded bodies, a cold compressive strength of 83 N/mm$^2$ was obtained.

The synthetic resin-bound molded bodies were subequently heated to a temperature of 180° C. and thereby cured. They had a strength so great that they could be transported readily and were installed in corresponding units in the steel mill. The determined cold flexural strength of the cured molded bodies was approximately 19 N/mm$^2$. In a parallel test, molded bodies were tempered to 1000° C. and their carbon content was determined. The carbon content was approximately 58% based on the amount of resin used (powder resin plus resin content of the liguid resin).

Various modifications of the binding agents and method of the invention may be made without departing from the spirit or scope thereof and it is to be understood that the invention is intended to be limited only as defined in the appended claims.

What we claim is:

1. A binding agent for molded bodies and molding compositions produced by prereacting a mixture of 5 to 60% by weight of sulfur-free lignin or a ligning fraction produced by the Organosolv process having a means molecular weight of 800 to 4000 and 40 to 95% by weight of a phenol novolac resin and subjecting the latter to high shear forces in a kneader or extruder and optionally mixing the same with a curing agent.

2. The binding agent of claim 1 wherein the lignin is obtained from coniferous trees.

3. The binding agent of claim 1 wherein the lignin is obtained from deciduous trees.

4. The binding agent of claim 1 wherein the lignin has a mean molecular weight of 800 to 1,500 and a sinter point of 80° to 120° C.

5. The binding agent of claim 1 wherein the curing agent is hexamethylenetetramine.

6. The binding agent of claim 1 wherein the curing agent is a phenol resol or epoxy resin.

7. The binding agent of claim 1 wherein the curing agent is an aminoaldehyde resin or a melamine formaldehyde resin.

8. A process for the preparation of a binding agent of claim 1 comprising homogeneously mixing 5 to 60% by weight of lignin or a lignin fraction obtained by the Organosolv process and 40 to 95% by weight of phenol novolac at 100° to 200° C. in the presence of high shear forces, cooling the mixture, optionally drying the mixture and grinding the mixture to a granulate with a grain size less than 2 mm.

9. The process of claim 8 wherein the temperature is 130° to 160° C.

10. The process of claim 8 wherein the phenol novolac is a mixture of low melting and higher melting phenol novolacs.

11. A curable molding composition containing a binding agent of claim 1.

12. A textile fleece containing a binding agent of claim 1.

13. A refractory composition containing a binding agent of claim 1.

14. A friction coating containing a binding agent of claim 1.

15. Carbon and graphite materials containing a binding agent of claim 1.

* * * * *